United States Patent
Wuppermann

[11] Patent Number: 5,982,817
[45] Date of Patent: Nov. 9, 1999

[54] TRANSMISSION SYSTEM UTILIZING DIFFERENT CODING PRINCIPLES

[75] Inventor: Friedhelm Wuppermann, Eindhoven, Netherlands

[73] Assignee: U.S. Philips Corporation, New York, N.Y.

[21] Appl. No.: 08/962,895

[22] Filed: Nov. 3, 1997

Related U.S. Application Data

[63] Continuation of application No. 08/539,145, Oct. 4, 1995, abandoned.

[30] Foreign Application Priority Data

Oct. 6, 1994 [EP] European Pat. Off. .............. 94202898

[51] Int. Cl.⁶ ................................................ H04B 14/06
[52] U.S. Cl. ............................ 375/244; 341/76; 381/106
[58] Field of Search ...................................... 375/242–245, 375/246–248, 252, 254, 240; 341/51, 67, 76, 57; 381/106

[56] References Cited

U.S. PATENT DOCUMENTS

| | | | |
|---|---|---|---|
| 4,330,689 | 5/1982 | Kang et al. ........................... | 179/15.55 |
| 4,513,426 | 4/1985 | Jayant ................................... | 375/244 |
| 4,677,671 | 6/1987 | Galand et al. ......................... | 381/31 |
| 4,912,763 | 3/1990 | Galand et al. ......................... | 381/31 |
| 4,922,510 | 5/1990 | Brusewitz ............................. | 375/240 |
| 4,933,762 | 6/1990 | Guichard et al. ..................... | 375/244 X |
| 5,206,884 | 4/1993 | Bhaskar ................................ | 375/244 |
| 5,265,190 | 11/1993 | Yip et al. .............................. | 295/2.28 |
| 5,684,920 | 11/1997 | Iwakami et al. ..................... | 395/2.12 |

FOREIGN PATENT DOCUMENTS 0673014   9/1995   European Pat. Off. .

OTHER PUBLICATIONS

Sinha et al., "Low Bit Rate Transparent Audio Compression using Adapted Wavelets", IEEE Trans on signal Processing vol. 41, No. 12, Dec. 1993.

Sinha et al., "Low Bit Rate Transparent Audio Compression Using Adapted Wave-lets", IEEE Transactions on Signal Processing, vol. 41, No. 12, Dec. 1993, pp. 3463–3479.

International Standard ISO/IEC DIS 11172 "Information technology—Coding of moving pictures and associated audio for digital storage media up to about 1.5 Mbit/s", section 3, pp. 174–337.

*Primary Examiner*—Chi H. Pham
*Assistant Examiner*—Bryan Webster
*Attorney, Agent, or Firm*—Jack D. Slobod

[57] ABSTRACT

In a transmission system for transmitting speech and music signals, an input signal is coded in a coder (11) by a time domain coder (4). The output signal of the time domain coder (4) is decoded by a time domain decoder (8) and the signal thus decoded is subtracted from the input signal by a subtracter circuit (10). To improve the coding quality, the difference signal is coded by a frequency domain coder (12) and the output signal of the time domain coder (4) and the frequency domain coder (12) are combined in a multiplexer (14) and transmitted to a receiver.

16 Claims, 3 Drawing Sheets

TRANSMISSION SYSTEM UTILIZING DIFFERENT CODING PRINCIPLES

This is a continuation of application Ser. No. 08/539,145, filed Oct. 4, 1995, now abandoned.

BACKGROUND OF THE INVENTION

The invention relates to a transmission system comprising a transmitter which includes a first coder for deriving a first coded signal from an input signal, a decoder for deriving a decoded signal from the first coded signal, determining means for determining a difference signal between the input signal and the decoded signal, at least a second coder for deriving at least a second coded signal from the difference signal and also transmitter means for transmitting the first and second coded signals by a transmit signal to a receiver, which receiver includes a first and a second decoder.

In addition, the invention relates to a transmitter, a receiver, a coder and a decoder to be used in such a transmission system, and a method of transmission, coding and decoding.

A transmission system as defined in the opening paragraph is known from the journal article "Low Bit Rate Transparent Audio Compression Using Adapted Wavelets by D. Sinha and A. H. Tewfik in IEEE Transactions on Signal Processing Vol. 41, No.12, December 1993.

Such transmission systems are used, for example, for transmitting speech or music signals by channels which have a limited transmission capacity.

A first example of such a channel is a radio channel between a mobile station and a fixed base station. The available transmission capacity of this channel is limited, because this channel is used by a great many users. A second example is a recording channel which utilizes a magnetic, optical or other recording medium such as, for example, a ROM. In that case the capacity is frequently limited too.

In the transmitter of the transmission system known from said journal article an input signal is converted into a coded signal by a first coder. The coded signal is converted into a decoded signal by a corresponding decoder in the transmitter. To improve the coding quality, the difference between the input signal and the decoded signal is determined, which difference signal is converted into the second coded signal by the second coder. The two coded signals are transmitted to the receiver where they are converted into a first decoded signal and a second decoded signal. By combining the two decoded signals in the combining means a reconstituted signal is obtained.

In prior-art transmission system the second coder is an adaptive wavelet transform coder. Such a coder is rather complicated. Besides, pre-echo signals occur due to the wavelet transform, which echoes detrimentally affect the perceptual quality of the transmission system.

SUMMARY OF THE INVENTION

It is an object of the invention to provide a transmission system according to the invention, whose complexity is reduced considerably compared with prior-art transmission systems, without this improvement leading to a degraded transmission quality.

For this purpose the invention is characterized in that at least one of the coders is a frequency domain coder, in that at least one of the decoders in the receiver is a frequency domain decoder, and in that the receiver comprises combining means for combining a decoded signal originating from the frequency domain decoder and a decoded signal originating from the other decoder to a reconstituted signal.

The substitution of a frequency domain coder for the wavelet transform coder considerably reduces the complexity. Experiments have surprisingly shown that this considerable reduction of complexity does not cause any noticeable loss of transmission quality. Such frequency domain coders may be based, for example, on the discrete Fourier transform, the discrete cosine transform or on the use of subband filters. The psychoacoustic properties of the human auditory system may also be utilized then.

An embodiment of the invention is characterized in that the first coder is a time domain coder, the second coder is a frequency domain coder, the first decoder is a time domain decoder and the second decoder is a frequency domain decoder. Examples of time domain coders are coders utilizing pulse code modulation, differential pulse code modulation, adaptive differential pulse code modulation, delta modulation, adaptive delta modulation and vector quantization.

It has appeared that a time domain coder followed by a frequency domain coder produces favourable results.

The transmission quality may be further improved by utilizing a linear prediction time domain coder. An example of such a coder is a CELP coder.

BRIEF DESCRIPTION OF THE DRAWINGS

The invention will be further explained with reference to the following drawing FIGS. in which like elements have like reference characters and in which.

DESCRIPTION OF THE PREFERRED EMBODIMENTS

Figure 1:
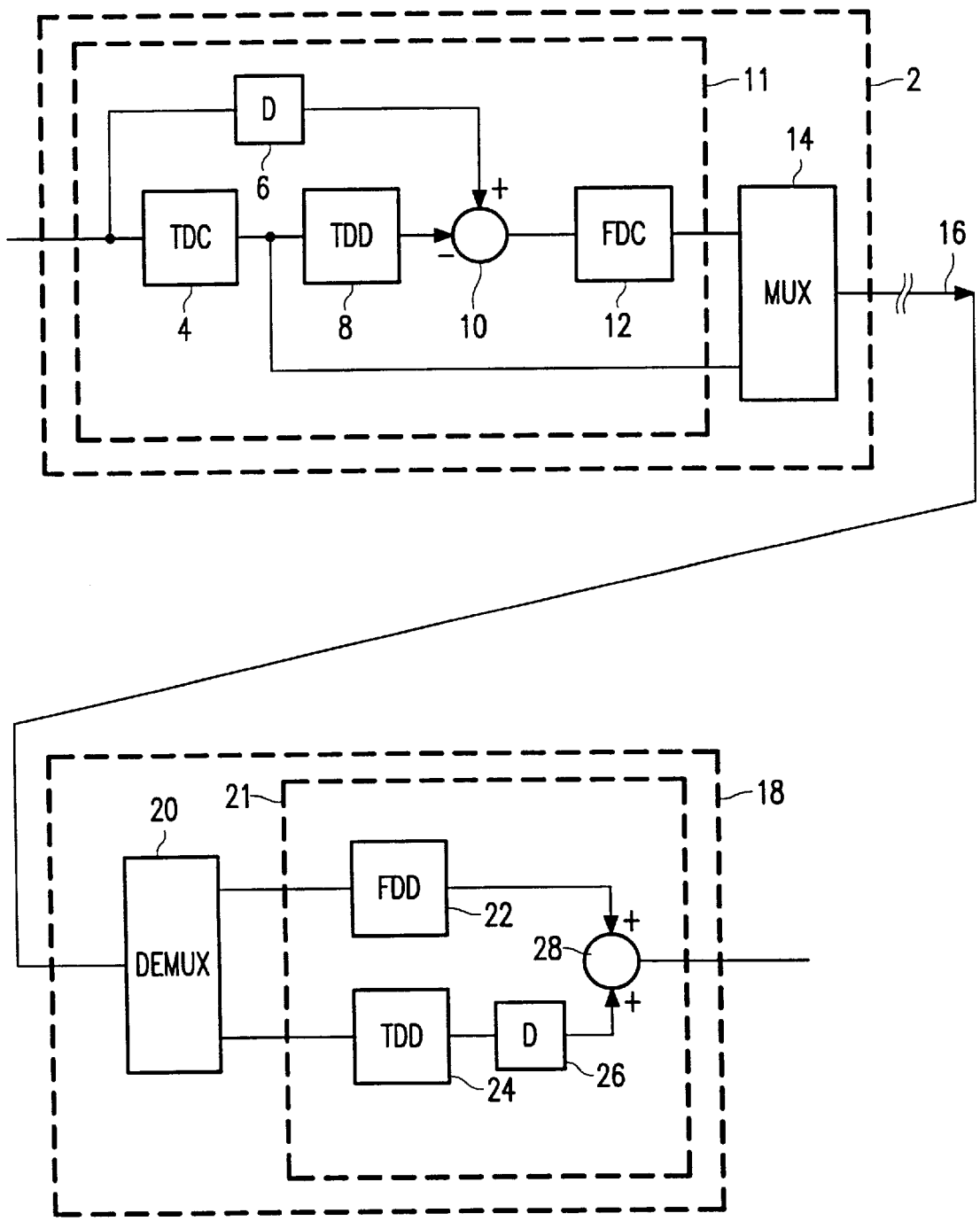
FIG. 1 shows a transmission system according to the invention.

In the transmission system shown in FIG. 1 an input signal is applied to an input of a coding system 11 i.e. an input of a first coder which is a time domain coder 4. The input signal is additionally applied to the input of a delay element 6. The output of the time domain coder 4 is connected to a first input of a multiplexer 14 and to an input of a decoder which is a time domain decoder 8.

The output of the delay element 6 is connected to a first input of a determining means for determining the difference signal, which determining means is a subtracter circuit 10. The output of the time domain decoder 8 is connected to a second input of the subtracter circuit 10. An output of the subtracter circuit 10 is connected to an input of the second coder, which is a frequency domain coder 12. The output of the frequency domain coder 12 is connected to a second input of the multiplexer 14. The output of the multiplexer 14, which output likewise forms the output of the transmitter 2, is connected to the transmitter channel 16.

The output of the transmitter channel 16 is connected in a receiver 18 to an input of a demultiplexer 20. A first output of the demultiplexer 20 is connected to a first input of the decoding system 21 which is an input of a first decoder i.e. a time domain decoder 24. The output of the time domain decoder 24 is connected to an input of a delay element 26. The output of the delay element 26 is connected to a first input of the combining means which is an adder circuit 28.

A second output of the demultiplexer 20 is connected to a second input of the decoding system 21, which is an input of the second decoder i.e. a frequency domain decoder 22. The output of the frequency domain decoder 22 is connected to a second input of the adder circuit 28. An output of the adder circuit 28 forms the output of the receiver 18.

In the transmission system shown in FIG. 1 an input signal is converted into a coded signal by the time domain coder 4. The first coded signal is converted into a decoded signal by the time domain decoder 8. The subtracter circuit 10 determines the difference between the input signal and the output signal of the time domain decoder 8. This difference signal is a measure for the coding error made by the combination of time domain coder 4 and time domain decoder 8. The delay element 6 is present to provide that the delay of the input signal is equal to the delay that occurs in the combination of time domain coder 4 and time domain decoder 8. A suitable implementation of the time domain coder 4 is described, for example, in CCITT Recommendation G.728 "Coding of speech at 16 kbit/s using low delay code excited linear prediction". This coder is based on the principle of "analysis by synthesis".

In this vector quantizer the input signal to be coded is converted into successive segments of a number of signal samples of the signal to be coded. For a large number of codebook words stored in a codebook a synthesized signal segment is produced with a synthesis filter. The difference between the current segment of the input signal and the synthesized signal segment is filtered by a perceptual weighing filter. The squared sum of a signal sample is computed from a segment of an output signal sample of the perceptual weighing filter.

The computation of the synthesized signal, the formation of the difference between the input signal and the synthesized signal, the filtering with the perceptual weighing filter and the computation of the squared sum is effected for each of the available 128 codebook words, while also a scaling factor is determined which may assume eight values. From these codebook words is selected the codebook word that leads to the least square sum.

The transfer function of the analysis filter is determined by means of linear prediction of an estimate of the relation between successive signal samples in the four synthesized signal segments preceding the current segment. The coded signal now comprises a codebook index of the selected codebook word. There is observed that the prediction parameters need not be transferred. Since an analysis-by-synthesis coder already includes a decoder, it is not necessary to utilize a separate decoder 8, but it will be sufficient to render the difference signal already occurring in coder 4 available. The delay element 6 and the subtracter circuit 10 are then not needed either.

The difference signal on the output of the subtracter circuit 10 is converted by the frequency domain coder 12 into a second coded signal. The parameters of the time domain coder 4 and the frequency domain coder 12 are tuned to each other in that either coder receives a signal to be processed for which that particular coder produces an optimum ratio of coding quality to required transmission rate. For example, it is conceivable that the time domain coder produces favourable results especially for lower frequencies, whereas the frequency domain coder, for example, a subband coder utilizing psycho-acoustic masking effects, produces favourable results for the higher frequencies.

The multiplexer 14 combines the first and second coded signals and provides that the combined signal is transmitted to the receiver 18.

In the receiver 18 the multiplexer derives the first and second coded signals from the received combined signal. The first coded signal is converted by the time domain decoder 24 into a first decoded signal, while the frequency domain decoder 22 converts the second coded signal into a second decoded signal which represents the difference signal. As for the first decoded signal, the adder circuit 28 adds up the difference signal to the first decoded signal. The delay element 26 is present to have the first decoded signal and the difference signal undergo a like delay.

Figure 2:
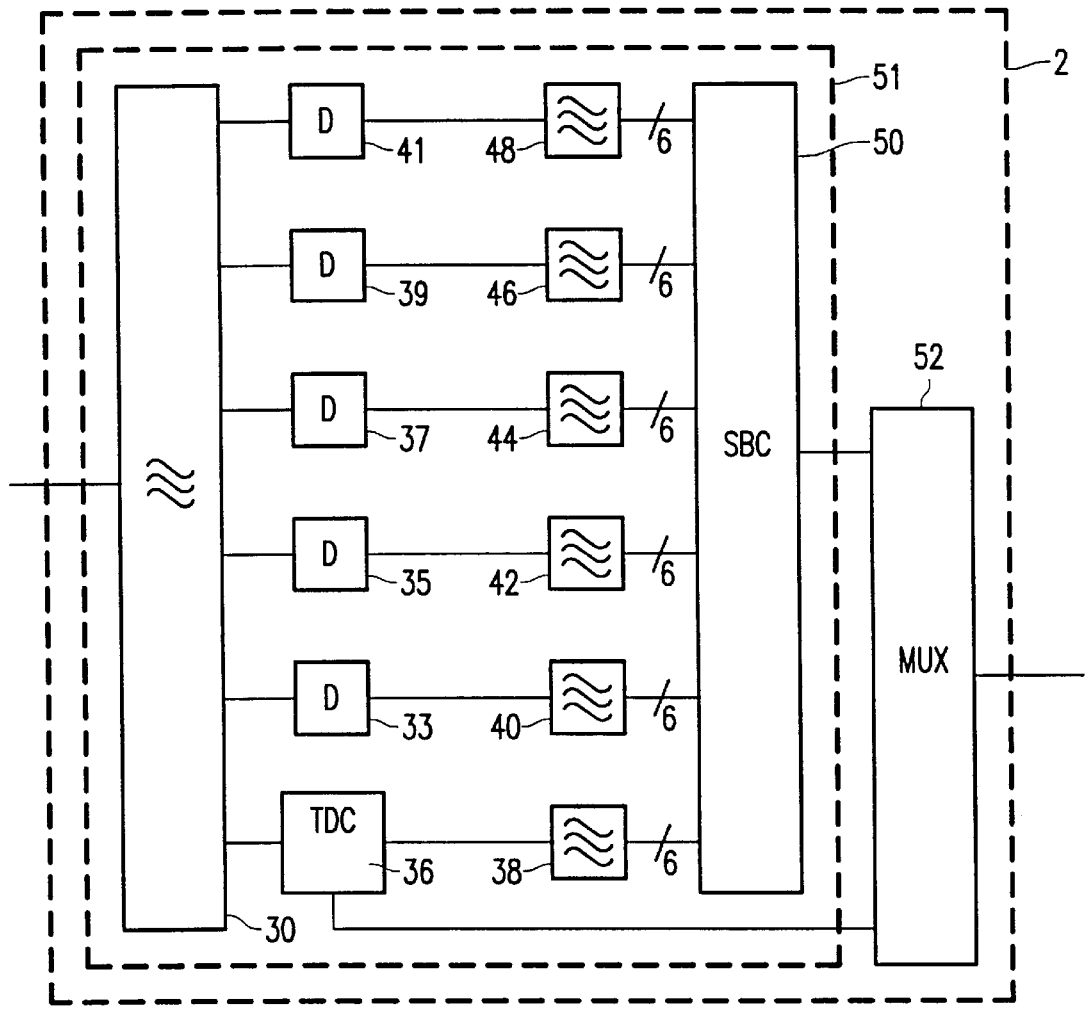
FIG. 2 shows an embodiment for the transmitter 2 in the transmission system shown in FIG. 1.

In the transmitter 2 shown in FIG. 2 the input signal is applied to an input of filter means 30 in the coder 51. A first output of the filter means 30 is connected to an input of the first coder which is a vector quantizer 36 utilizing linear prediction (LPC: Linear Predictive Coding). The output signal on a first output of the filter means 30 represents a spectral portion having a frequency range from 0–4 kHz of the input signal, which input signal has a maximum frequency range of 24 kHz which is sampled at a 48 kHz sampling rate. An output of the time domain coder 36, which carries the first coded signal for its output signal, is connected to a first input of the transmitter means in this case formed by a multiplexer 52. A second output of the time domain coder 36, which carries the difference signal for its output signal, is connected to an input of a subband filter 38. Six outputs of the subband filter 38 are connected to six inputs of the frequency domain coder which is formed here by a subband coder 50.

Five further outputs of the filter means 30 are connected each to an input of a delay element 33, 35, 37, 39 and 41. The outputs of the delay elements 33, 35, 37, 39 and 41 are connected each to a dedicated subband filter 40, 42, 44, 46 and 48, respectively. Six outputs of each of the subband filters 38, 40, 42, 44, 46 and 48 are connected to six inputs of the subband coder 50. An output of the subband coder 50 carrying the second coded signal for its output signal is connected to a second input of the multiplexer 52.

The input signal of the transmitter 2 shown in FIG. 2 is split up by the filter means 30 into a number of spectral portions each having a bandwidth of 4 kHz. The spectral portion from 0–4 kHz is converted into a first coded signal by the time domain coder 36. A suitable implementation of the time domain coder 36 has already been explained with reference to FIG. 1. The coded signal is converted into a decoded signal by a time domain decoder 67 present in the time domain coder 36. Besides, the difference signal is determined in the time domain coder 36. The second output of the time domain coder 36 then carries the difference signal which represents a coding error of the time domain coder.

The further spectral portion of the input signal is represented by the subband signals on the output of the filter means 30. These subband signals having a bandwidth of 4 kHz are delayed in the delay elements 33, 35, 37 and 39, so that these subband signals undergo a like delay to the first subband signal processed by the time domain coder 36. Each of the subband signals thus obtained is converted into six further subband signals having a bandwidth of 667 Hz by the filters 38, 40, 42, 44, 46 and 48. The addition of the time domain coder 36 and the subtracter circuit 34 makes it possible to recode any coding error of the time domain coder 36 by means of the subband coder 50 and transmit same to the receiver. These measures make it possible to realise an improvement of the transmission quality. The required additional complexity is small, because there is already a time domain decoder available in an analysis-by-synthesis time domain decoder.

There is observed that the subband signals on the output of the filter means 30 are baseband signals representing a passband signal in that particular subband. This baseband representation is advantageous in that the required number of samples per subband is determined by the bandwidth of that particular subband and not by the maximum frequency of that particular subband. A suitable implementation of the subband coder 64 for signals having a 48 kHz sampling rate is known from the Draft International Standard ISO/IEC DIS 11172 "Information technology—Coding of moving pictures and associated audio for digital storage media up to about 1.5 Mbit/s", section 3, pages 174–337. The subband signals on the input are converted into a digital signal by means of quantization. The subband signals are quantized with a number of levels that may be different for different subbands. The actual number of quantization levels used for each subband depends on the power of that particular subband signal and the power of the subband signals of adjacent subbands. The property of the human auditory system that a weak signal near to a strong signal is inaudible is made use of. As a result it is possible to quantize such a weak signal with considerably fewer quantization levels than the strong signal. Based upon the power of the various subband signals, a just perceivable noise level is computed for each subband. For each subband signal the number of required quantization levels is computed from this noise level. The second coded signal now consists of different quantized subband signals and of information about the number of quantization levels of each subband. There is observed that the coder described above is arranged for coding a signal having a frequency from 0 to 24 kHz. Since a spectral portion from 0–4 kHz is coded by the time domain coder, the subbands lying in this spectral area contain only the coding error signal which will have a relatively small amplitude. As a result, no more than a few bits will be allocated to these subbands, so that hardly any additional transmission capacity is necessary for transmitting this coding error signal.

The multiplexer 52 combines the first coded signal and the second coded signal to a single signal.

Figure 3:
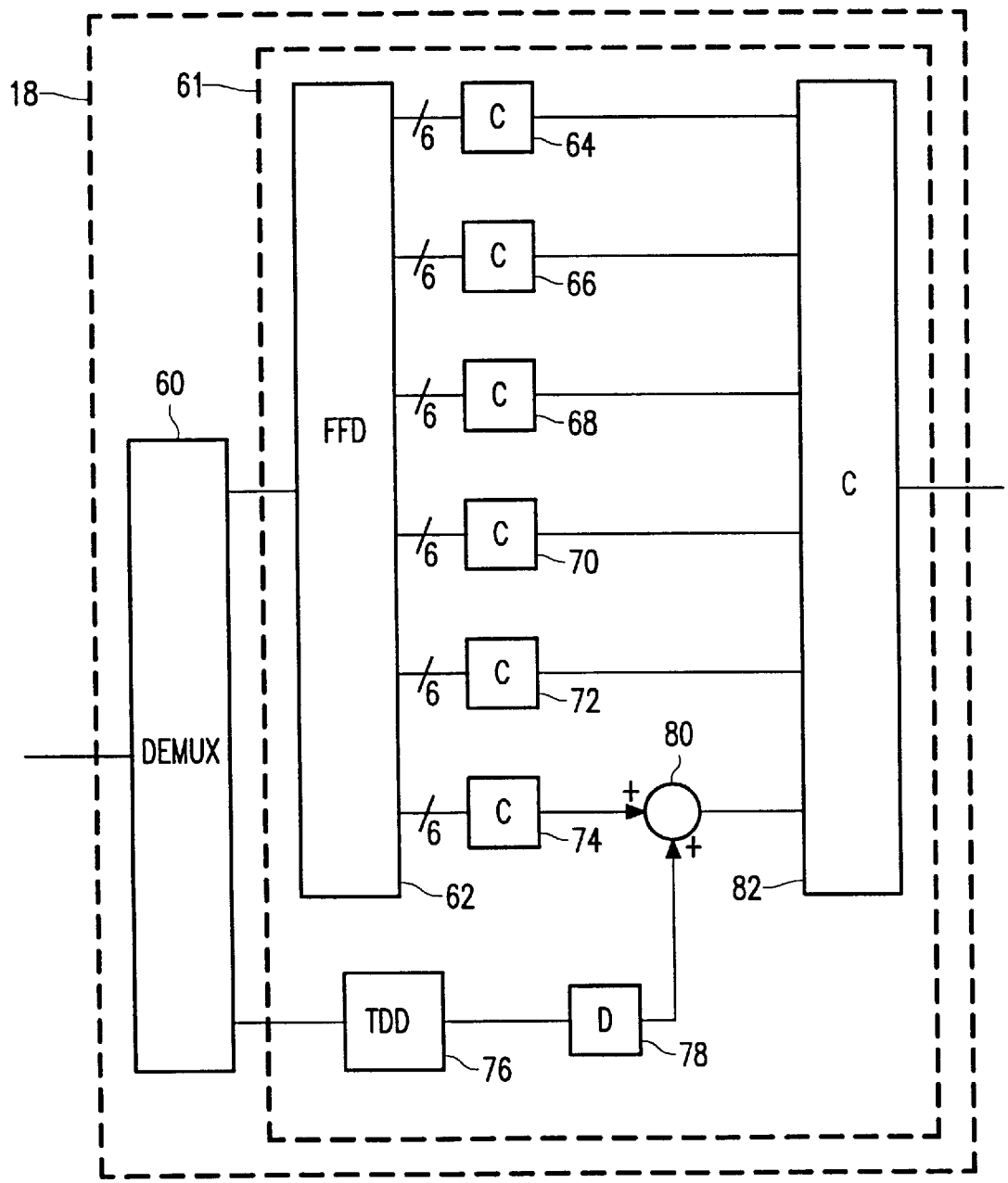
FIG. 3 shows an embodiment for the receiver 18 in the transmission system as shown in FIG. 1.

In the receiver 18 shown in FIG. 3 the signal is applied to the input of a demultiplexer 60. A first output of the demultiplexer 60, carrying the first coded signal for its output signal, is connected to a time domain decoder 76. An output of the time domain decoder 76, carrying the first decoded signal for its output signal, is connected to an input of a delay element 78. The output of the delay element 78 is connected to a first input of an adder circuit 80. The output of the adder circuit 80 is connected to a first input of the combining means 82. A second output of the demultiplexer 60 is connected to an input of the frequency domain decoder which is in this case a subband decoder 62. A number of outputs of the subband decoder 62, carrying reconstituted signals for their output signals, which reconstituted signals represent further spectral portions of the input signal, are connected each to an input of combining means 64, 66, 68, 70, 72 and 74. An output of the combining means 74 is connected to a second input of the adder circuit 80. The outputs of the combining means 64, 66, 68, 70, and 72 are connected to associated inputs of the combining means 82. The reconstituted input signal is available on the output of the combining means 82.

In the receiver the received signal is decomposed by the demultiplexer 60 into the first and second coded signals. The first coded signal is converted by the time domain decoder 76 into a first reconstituted signal. A suitable implementation of the time domain decoder 76 is described in said CCITT Recommendation G.728.

The second coded signal is converted by the subband decoder 62 into a number of decoded subband signals which are available on the outputs of the subband decoder 62. The output signal of the lower six subbands are converted by the combining means 74 into a subband signal having a bandwidth from 0–4 kHz, which subband signal represents the difference signal. This difference signal is added to the decoded signal on the output of the delay element 78 by the adder circuit 80. Groups of six adjacent subband signals on the output of the subband decoder 62 are combined in the combining means 64, 66, 68, 70 and 72 to subband signals having a bandwidth of 4 kHz. The output signals of these combining means 64, 66, 68, 70 and 72 and the output signal of the adder circuit 80 are combined in the combining means 82 to the reconstituted signal.

There is observed that these subband signals on the input of the subband decoder 72 are baseband signals which represent the bandpass filter in that particular subband. This baseband representation is advantageous in that the required samples per subband are determined by the bandwidth of that particular subband and not by the maximum frequency in that particular subband. The combining means 88 convert the subband signals to the desired subband frequency and then combine them with a decoded signal to a reconstituted input signal. The bandwidth of all the subbands in the subband coder 50 and in the subband decoder 62 are all the same. By equalizing this bandwidth, the subband decoder may be considerably simpler than a decoder utilizing subbands that have different bandwidths.

The invention claimed is:

1. Transmission system comprising a transmitter which includes a first audio coder for deriving a first coded signal from an input signal, a decoder for deriving a decoded signal from the first coded signal, determining means for determining a difference signal between the input signal and the decoded signal, at least a second audio coder for deriving at least a second coded signal from the difference signal and also transmitter means for transmitting the first and second coded signals by a transmit signal to a receiver, which receiver includes first and a second audio decoders, wherein the first audio coder is a time domain coder and the second audio coder is a frequency domain coder, the first audio decoder in the receiver is a time domain decoder and the second audio decoder in the receiver is a frequency domain decoder, and the receiver comprises combining means for combining a decoded signal originating from the first decoder and a decoded signal originating from the second decoder to form a reconstituted analog audio signal.

2. Transmission system as claimed in claim 1, wherein the time domain coder comprises linear prediction means.

3. Transmission system as claimed in claim 1, wherein the frequency domain coder comprises a subband coder and the frequency domain decoder comprises a subband decoder.

4. Transmitter comprising a first audio coder for deriving a first coded signal from an analog audio input signal, a decoder for deriving a decoded signal from the first coded signal, determining means for determining a difference signal between the input signal and the decoded signal, at least a second audio coder for deriving at least a second coded signal from the difference signal, which transmitter likewise comprises transmitting means for transmitting the first and second coded signals, wherein the first audio coder is a time domain coder and the second audio coder is a frequency domain coder.

5. Receiver for deriving a reconstituted analog audio signal from first and second decoded signals, which receiver comprises first and second audio decoders and combining means for additively combining decoded signals from the first and second decoders to form the reconstituted signal, wherein the first audio decoder is a time domain decoder and the second audio decoder is a frequency domain decoder.

6. Coding system comprising a first audio coder for deriving a first coded signal from an analog audio input signal, a decoder for deriving a decoded signal from the first coded signal, determining means for determining a difference signal between the input signal and the decoded signal, at least a second audio coder for deriving at least a second coded signal from the difference signal, wherein the first audio coder is a time domain coder and the second audio coder is a frequency domain coder.

7. Decoding system for deriving a reconstituted analog audio signal from first and second coded signals, which system comprises first and second audio decoders, wherein the first audio decoder is a time domain decoder and the second audio decoder is a frequency domain decoder and the decoding system comprises combining means for additively combining decoded signals from the first and second decoders to form the reconstituted signal.

8. Method of transmitting an analog audio input signal which method comprises deriving a first coded audio signal from an input signal, deriving a decoded signal from the first coded audio signal, determining a difference signal between the input signal and the decoded signal, deriving at least a second coded audio signal from the difference signal, transmitting the first and second coded audio signals by a transmission channel to a receiver, wherein the first coded audio signal is obtained by time domain coding and the second coded audio signal is obtained by frequency domain coding and the method comprises combining a decoded signal obtained from time domain decoding the first coded audio signal and a further decoded signal obtained from frequency domain decoding the second coded audio signal to form a reconstituted analog audio signal.

9. Method of transmitting an analog audio input signal which method comprises deriving a first coded audio signal from an input signal, deriving a decoded signal from the first coded audio signal, determining a difference signal between the input signal and the decoded signal, deriving at least a second coded audio signal from the difference signal and transmitting the first and second coded audio signals, wherein the first coded audio signal is obtained from time domain coding and the second coded audio signal is obtained from frequency domain coding.

10. Method of receiving first and second coded audio signals, which method comprises obtaining a decoded signal from time domain decoding the first coded audio signal, obtaining a further decoded signal from frequency domain decoding the second coded audio signal, and additively combining the decoded signal and the further decoded signal to form a reconstituted analog audio signal.

11. Method of coding an analog audio input signal which method comprises deriving a first coded audio signal from an input signal, deriving a decoded signal from the first coded signal, determining a difference signal between the input signal and the decoded signal, deriving at least a second coded audio signal from the difference signal, wherein the first coded audio signal is obtained from time domain coding and the second coded audio signal is obtained from frequency domain coding.

12. Method of decoding a reconstituted analog audio signal from first and second coded audio signals, which method comprises obtaining a decoded signal from time domain decoding the first coded audio signal, obtaining a further decoded signal from frequency domain decoding the second coded audio signal, and additively combining the decoded signal and the further decoded signal to form the reconstituted analog audio signal.

13. Transmitter as claimed in claim 4, wherein the time domain coder comprises linear prediction means.

14. Transmitter as claimed in claim 4, wherein the frequency domain coder comprises a subband coder.

15. Transmission system as claimed in claim 2, wherein the frequency domain coder comprises a subband coder and the frequency domain decoder comprises a subband decoder.

16. Transmitter as claimed in claim 13, wherein the frequency domain coder comprises a subband coder and the frequency domain decoder comprises a subband decoder.

* * * * *